United States Patent [19]

West

[11] 4,044,552
[45] Aug. 30, 1977

[54] GAS TURBINE ENGINE SYNCHRONOUS SPEED DETECTOR

[75] Inventor: Gene A. West, Kokomo, Ind.

[73] Assignee: General Motors Corporation, Detroit, Mich.

[21] Appl. No.: 706,495

[22] Filed: July 19, 1976

[51] Int. Cl.² ............................................. F02C 3/10
[52] U.S. Cl. ............................. 60/39.16 S; 60/39.24
[58] Field of Search ................... 60/39.16 S, 39.16 R, 60/39.24

[56] References Cited

U.S. PATENT DOCUMENTS

| 3,237,404 | 3/1966 | Flanigan et al. | 60/39.16 |
|---|---|---|---|
| 3,710,576 | 1/1973 | Evans et al. | 60/39.03 |
| 3,899,877 | 8/1975 | Flanigan et al. | 60/39.16 S |

*Primary Examiner*—Carlton R. Croyle
*Assistant Examiner*—Robert E. Garrett
*Attorney, Agent, or Firm*—J. C. Evans

[57] ABSTRACT

A gas coupled or free turbine type gas turbine engine of the type having two or more independently rotatable turbines has a set of hydraulic (oil cooled) clutches for coupling a gasifier turbine to a power turbine and wherein the turbine engine includes a combustor for supplying motive fluid to both of the turbines and having an operating characteristic that produces an abrupt fall in the motive fluid temperature at the turbine inlets upon synchronous operation of the independently rotatable turbines. The clutch pressure is controlled by means including an electrically energizable valve component associated wih a control circuit including quick dump inhibit switch means coupled to a synchronous detector for disabling the quick dump inhibit switch during normal operation and wherein means are included to produce a signal in accordance with the turbine inlet temperature; a pre-selected turbine inlet temperature control schedule and a rate of change of gasifier turbine speed and further including a comparator responsive to an abrupt change in output temperature reflecting synchronous speed operation of the turbines and operative to condition the synchronous detector to produce a control signal for operating the quick dump inhibit switch thereby to condition the clutch control switch for producing a quick dump of hydraulic pressure in the clutch to avoid gasifier compressor surge.

3 Claims, 4 Drawing Figures

GAS TURBINE ENGINE SYNCHRONOUS SPEED DETECTOR

This invention relates to turbine engine engines and more particularly to an improved synchronous speed control system for controlling a power transfer clutch device for selectively coupling a rotatable power turbine from a gasifier turbine and operative following a synchronous speed phase of turbine operation to dump clutch pressure when the engine load increases.

Reexpansion gas turbine engines of the type including independently rotatable gasifier turbines and power turbine components of the gas coupled type include a compressor, combustion apparatus supplied by the compressor, and a gas generator turbine supplied with motive fluid by the combustion apparatus. The gas generator turbine drives the compressor through a shaft. The exhaust from the turbine powers a load turbine connected through a shaft to a load which may include any suitable power transmission devices such as clutches, torque converters, gear boxes, and the like, and may include, for example, the driving wheels of a motor vehicle. Shaft is connected through shaft and gearing to input shaft of a power transfer clutch. The other input to clutch is through shafting and gearing from the power output shaft.

The engine as described is of a known type and the clutch may be a known type of friction clutch, the plates of which are engaged by a hydraulic cylinder or motor so that engaging force and torque capacity are proportional to the pressure of fluid within the cylinder.

This sort of power plant, particularly the power transfer clutch, is described in Flanigan et al U.S. Pat. No. 3,237,404 issued Mar. 1, 1966.

An engine of this nature is also described in Collman et al. U.S. Pat. No. 3,267,674 issued Aug. 23, 1966. The patents illustrate engine including regenerators, which may or may not be included in the engine.

The purpose of the power transfer clutch, as pointed out clearly in the Flanigan et al patent, is to take power from turbine and deliver it to an output shaft at lower load conditions of the engine so as to maintain a relatively high turbine inlet temperature in the gas generator and thus benefit engine economy. It has other functions, including transfer of power from the load shaft to the engine compressor for power turbine speed limiting and vehicle braking. These need not be enlarged upon here.

With modern development of electronic control systems incorporating solid state electronic devices, there is a trend for a great part of the control of such engines to be taken over by such electronic systems. If electronic engine controls are employed, an electrical signal from such controls is used to control the torque of the power transfer clutch.

A hydraulic system suitable for supplying and withdrawing fluid at desired rates for such purposes and effective to control the clutch-engaging pressure accurately in response to an electrical signal such as turbine inlet temperature which may be generated by any appropriate electric or electronic control system is set forth in U.S. Pat. No. 3,964,506 filed May 2, 1973 to Richard G. Grundman for Pressure Control System.

One characteristic of reexpansion gas turbine engines with power transfer of the type set forth in the aforesaid Grundman application is the fact that the inlet temperature of motive fluid to the independently rotatable turbine stages abruptly drops when the speed of the output turbine is synchronous with that of the gasifier turbine.

Another characteristic of such gas turbine engines is that the power transfer clutch will slip or be locked up continuously in accordance with the turbine inlet temperature. The power transfer clutch, when slipping, can transfer torque in either direction. If the gasifier turbine speed is greater than that of the power turbine speed, a rise in the turbine inlet temperature will be produced because of governing action of the gasifier turbine speed. Turbine inlet temperature increases engine efficiency especially in the part power region of operation. On the other hand, if the power turbine output speed tends to overspeed the gasifier turbine, the clutch locks up and power is transferred from the output power turbine to the gasifier turbine and is absorbed in driving and the gasifier compressor. More specifically, when the gasifier turbine speed exceeds that of the power turbine speed and the power transfer clutch is engaged, a torque is applied to the gasifier turbine shaft which tends to reduce its speed, however, the governing action of an associated fuel control of the type set forth in U.S. Pat. No. 3,853,142 issued Dec. 10, 1974 to Richard G. Grundman for Flow Control System tends to maintain the gasifier turbine speed. In order to maintain the speed of the gasifier turbine more fuel is demanded by the fuel control system and this in turn causes an increase in the temperature in the motive fluid at the turbine inlets. In this mode of operation, torque is transferred to the output shaft to produce additional horsepower.

An object of the present invention is to provide an improved synchronous speed detection system for use with a power transfer system of a two shaft gas turbine engine including means responsive to an abrupt fall in the turbine inlet temperature at synchronous speed conditions to permit the output power turbine to reach full synchronous speed with the gasifier turbine so as to improve engine efficiency while accurately and abruptly conditioning a quick dump inhibit switch when engine load increases following occurrence of synchronous speed operation to decouple the power transfer system to prevent compressor surge.

Still another object of the present invention is to provide a precise synchronous detection system for use in gas turbine engines having independently rotatable gasifier and power turbine components coupled by a power transfer system including a clutch and an operational characteristic wherein turbine inlet temperature abruptly falls when the independently rotatable turbines stages are at synchronous speed operation; the detection system including a quick dump inhibit switch and a temperature responsive detector that has a high state output when the turbine inlet temperature is greater or at least equal to a desired operating temperature schedule minus a predetermined temperature differential and minus a predetermined temperature change in accordance with the rate of change of gasifier speed and by the further provision of a synchronous detector circuit for sensing the speed of the power turbine and gasifier turbine and operative to maintain a high state signal when the power turbine speed is below the gasifier speed with the high state signal conditioning the quick dump inhibit switch to prevent fast dump of power transfer and wherein, as the power output turbine reaches synchronous speed with that of the gasifier turbine inlet temperature abruptly falls to cause the temperature responsive detector to be conditioned for response to a low state when turbine inlet temperature increases following the abrupt fall in temperature thereby to operate the quick dump inhibit switch for quick reduction in clutch pressure.

Further objects and advantages of the present invention will be apparent from the following description, reference being had to the accompanying drawings wherein a preferred embodiment of the present invention is clearly shown.

Figure 1:
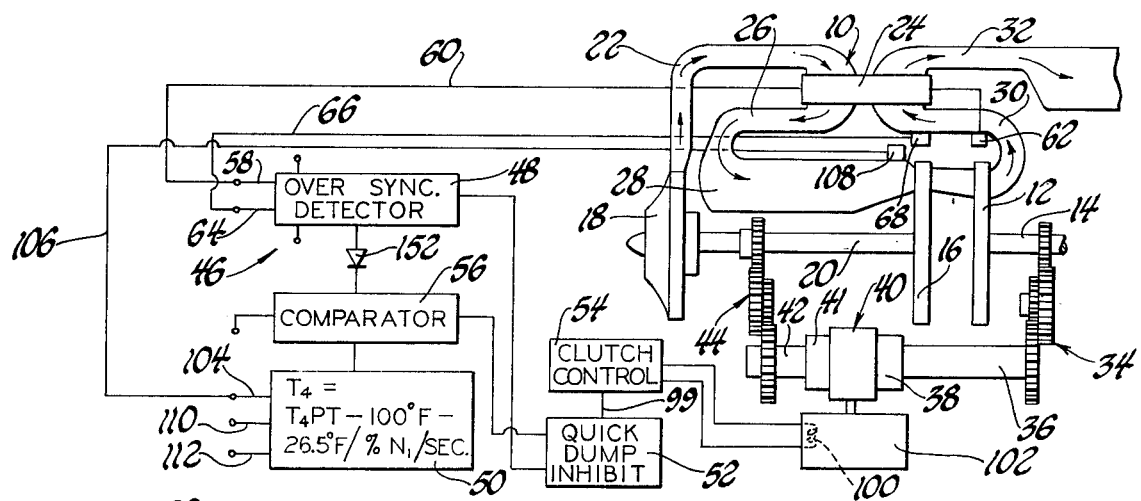
FIG. 1 is a diagrammatic view of a gas turbine engine having a power transfer clutch and an associated synchronous speed detector control circuit.
Figure 2:
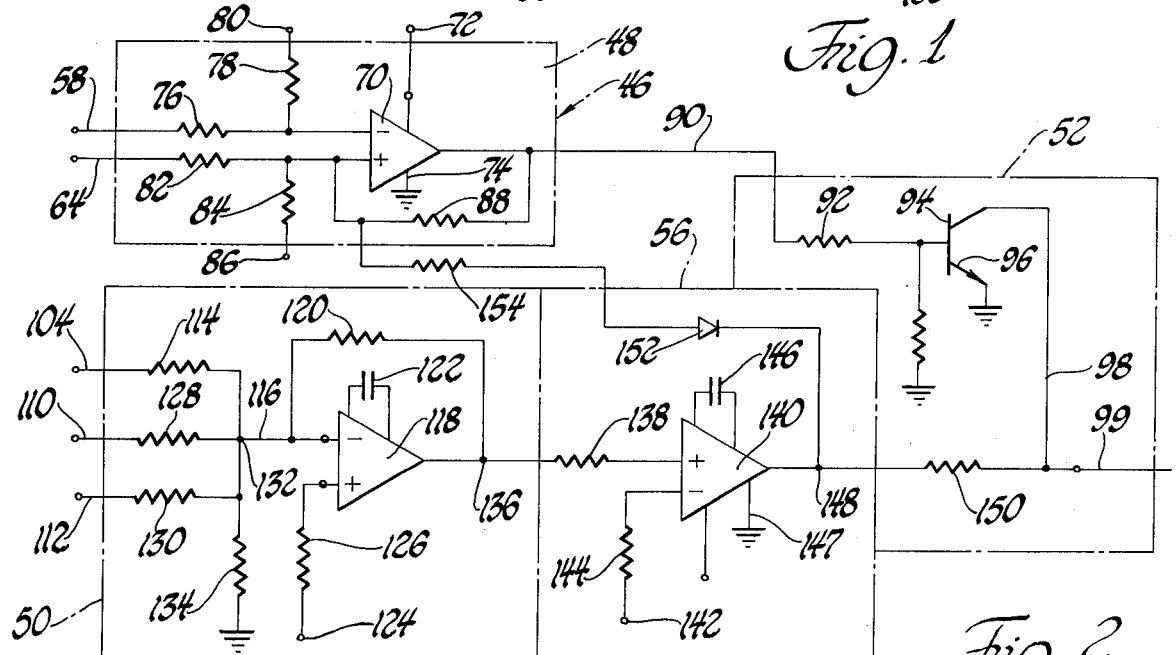
FIG. 2 is an electrical circuit diagram of the synchronous speed detector control circuit in FIG. 1.

Referring now to the drawings, a gas turbine engine 10 is illustrated in FIG. 1. It includes an output or power turbine 12 connected to an output shaft 14. Additionally it includes a gasifier turbine 16 connected to a gasifier compressor 18 through a shaft 20. The output turbine 12 and gasifier turbine 16 are of the independently rotatable type which are characterized as being gas coupled or of the free turbine class. Such compressors are well known and the details thereof are more particularly set forth in U.S. Pat. No. 3,237,404 issued Mar. 1, 1966, to Flanagan et al. For purposes of the present invention it is only necessary to point out that the gasifier compressor 18 has an outlet connected to a duct 22 connected to a regenerator 24 including a rotatable matrix through which the compressed air from the duct 22 passes into a supply duct 26 for directing compressed air into the inlet of the turbine engine combustor 28 having a fuel supply of the type set forth in the aforementioned Flanagan et al patent. The air and fuel flow to the combustor apparatus 28 are ignited and the combustion products are directed therefrom across the gasifier turbines 16 and output turbine 12 as motive fluid for the turbines Exhaust from the turbines is through a duct 30 across the regenerator 24 and to atmosphere through an exhaust duct 32.

In accordance with the present invention the output shaft 14 is connected to a gear train 34 to a shaft 36 connected to one face 38 of a power transfer clutch 40. The opposite face 41 of the clutch 40 is connected by a shaft 42 through a gear train 44 to the shaft 20.

The clutch 40 serves as a means for coupling the gasifier turbine 16 to the power turbine 12. As set forth in the Flanagan et al patent the power transfer can be accomplished through a wide range of slip clutch devices. In the present invention it is accomplished through a set of hydraulic (oil cooled) clutches that can be slipped or locked up continuously in accordance with engine operation.

The clutch, when slipping, will transfer torque in either direction. If the gasifier turbine speed is greater than the power turbine speed a rise in the turbine engine temperature will be attained due to the fuel governing action of the gasifier turbine. The attendant rise in the motive fluid temperature at the turbine inlet increases engine efficiency especially in the part power region of operation. If the power turbine 12 tends to overspeed the gasifier turbine, the clutch 40 is conditioned to lock up and power will then be transferred from the power turbine into the gasifier turbine which power is then absorbed to drive the gasifier compressor 18. This explanation of power transfer is rudimentary with greater explanation being detailedly set forth in the aforesaid Flanagan et al patent. For purposes of the present invention attention is directed to a mode of operation wherein the power turbine speed rises relative to the gas generator turbine speed until the power transfer clutch slip in zero which represents a synchronous speed condition of operation in the power transfer system. Under such conditions it is desirable to be ready to dump the hydraulic fluid pressure in the clutch in the event that the output load increases to cause a resultant rapid decrease in gasifier speed with a possibility of resultant fluid surge in the gasifier compressor 18.

In the past, synchronous speed operation has been detected by using a direct comparison of the processed frequencies of the power turbine speed with that of the gasifier turbine speed. In such prior synchronous speed detection systems, when the output turbine speed approached within three percent of the gasifier speed under normal operating conditions, a signal is generated to cause the power transfer clutch pressure to quickly drop in anticipation of synchronous operation to prevent overspeed of the gasifier compressor and resultant surge. Such systems do not take advantage of the full power transfer capacity of the system since the clutch pressure is dumped prior to the time that full synchronous speed operation occurs.

The present invention includes an electronic control 46 which regulates clutch pressure to enable power to be derived from the gasifier turbine 16 and to be delivered to the output shaft 14 at lower load conditions of the engine up to the point at which the speed of the gasifier turbine 16 is synchronous with that of the output turbine 12. This enables the turbine inlet temperature to be increased over the 1650° F range to a more elevated temperature, for example, in the range of 1750° F. The 100° F differential enables the turbine engine to be operated more efficiently.

The control system 46 includes an over-synchronous speed detector 48 and temperature signal generator 50. Detector 48 is maintained in a normally high output signal state so as to maintain a quick dump inhibit switch 52 conditioned to maintain a fast dump clutch control switch 54 deenergized so as to prevent a fast dump of the clutch 40 in the power transfer system during normal operation. The over-synchronous speed detector 48 is resettable in response to a predetermined output signal from the temperature signal generator 50 through a comparator 56 which will reset the over-synchronous speed detector 48 to a low signal state by means of diode 152 to allow a subsequent fast dump of power transfer to occur when the turbine inlet temperature is greater or equal to the expression: $T4 = T4_{PT} - 100°$ F $- 26.5°$ F/%$N_1$/second.

The term $T4_{PT}$ is a desired turbine inlet temperature schedule. The term $N_1$ is the rate of change of gasifier speed.

The over-synchronous speed detector 48 includes a first input 58 connected by means of a conductor 60 to a speed signal generating pickup 62 for sensing the speed of the output turbine 12. A second input 64 to the detector 48 is connected by a conductor 66 to a second speed signal generating pickup 68 for detecting the speed of the gasifier turbine 16. The inputs 58, 64 are connected to an operational amplifier 70 having inverting and non-inverting input circuits and an output circuit designed to have hysteresis proportional to positive feedback impedance 88 connected between the output circuit and noninverting input circuit impedances 82 and 84. Power supply for the operational amplifier 70 is in the form of a 10 volt input 72 and a ground connection at 74. In the illustrated arrangement, the input 58 is connected through a 10K ohm resistor 76 and to voltage divider resistor 78 connected to a 5 volt power supply 80 thence to the inverting input of the operational amplifier 70. The input 64 is connected through a 10K ohm resistor 82 and to a voltage divider resistor 84 connected to a 5 volt input 86 thence to the non-inverting input of the operational amplifier 70. In the illustrated arrangement feedback impedance between the output circuit of the operational amplifier 70 and the non-inverting input thereof is a 330K ohm resistor 88.

The output of the amplifier 70 is connected by a conductor 90 thence through a resistor 92 to the base of an NPN transistor 94 having its emitter 96 connected to ground and its collector connected by a conductor 98 to the input 99 of clutch control switch 54 for controlling the energization of a solenoid coil 100 for regulating the position of a flow modulating valve is a pressure control system 102 of the type more specifically set forth in U.S. Pat. No. 3,964,506 filed May 2, 1973 to Richard G. Grundman for a Pressure Control System.

Pressure control system 102 is characterized as being operative, when the coil 100 is energized, to vary the fluid pressure in the clutch 40 to produce a variable slip between the power turbine components as discussed above. The detail components of the pressure control system 102 form no part of the present invention and are merely representative of one arrangement for controlling flow of pressurized fluid to and from the clutch 40.

The temperature signal generator 50 includes a first input 104 connected by conductor 106 to a temperature sensor 108 for signaling the turbine inlet temperature of motive fluid from the combustor 28. Additionally, the generator 50 includes a second input 110 to a signal source for generating a predetermined temperature schedule indicative of the desired turbine inlet temperature. A third input 112 is connected to a signal source of the derivative of the speed of rotation of the gasifier turbine 16. The input 104 is connected to a 33.2K ohm resistor 114 thence by conductor 116 to the inverting input of an operational amplifier 118 having a feedback resistor 120 and a stabilizing capacitor 122 thereacross. The operational amplifier 118 has a reference voltage at its non-inverting input from a closely regulated 5 volt source 124 connected through a 10K ohm resistor 126.

Further signals to the inverting input include a signal from the desired temperature schedule source 110 through a 33.2K ohm resistor 128 and a further signal from the speed derivative source 112 through a 51K ohm resistor 130, both connected to a common potential point 132 along with a further potential representing a fixed constant of minus 100° F defined by a 499K ohm resistor 134 connected between the potential point 132 and ground. The summation of the signals produced at the potential point 132 are in accordance with the T4 expression set forth above. This signal is compared to that imposed on the non-inverting input from the potential source 124 and the operational amplifier 118 is operative to produce a voltage differential signal at potential point 136 that is connected to a 10K ohm resistor 138 to the non-inverting terminal of an operational amplifier 140 which serves a comparator function in the control system 46. The operational amplifier 140 has a fixed reference voltage from a closely regulated 5 volt source 142 which is connected to a 10K ohm resistor 144 to the inverting terminal of amplifier 40. The operational amplifier 140 includes a stabilizing capacitor 146 thereacross and is grounded by a conductor at 147. Amplifier 140 is operative to produce a low or a high state output in accordance with aforementioned signals 104, 110 and 112.

When the turbine inlet temperature T4 abruptly drops at synchronous speed operation, the comparator 140 will be conditioned to produce a low voltage state at the output terminal 148. The potential point represented by terminal 148 is connected through a resistor 150 of 5.1K ohm to input 99 to clutch control switch 54.

In accordance with certain of the principles of the present invention the terminal 148 is connected through a diode 152 in series connection with a 510K ohm resistor 154 to the non-inverting input of the operational amplifier 70. This connection between the comparator 56 and the over-synchronous detector 48 resets the synchronous detector 48 to have an undersynchronous detector function.

More particularly, initially the over-synchronous detector 48 has its inverting and non-inverting inputs set at voltages which will maintain a high output condition in output circuit 90 so that the quick dump inhibit switch 52 will be rendered non-conductive. In one working embodiment the detector inputs initially are set to trip amplifier 70 at $N_2$ signal = $N_1$ signal + 3% (design speed).

Figure 3:
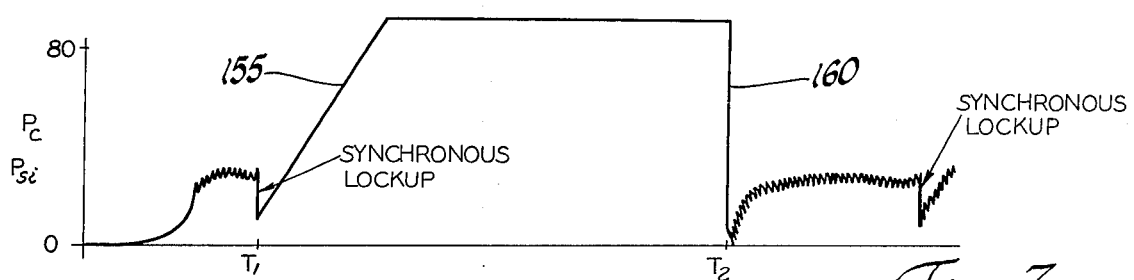
FIG. 3 is a chart of power transfer clutch pressure produced by the control circuit in response to an increase in output load following synchronous lock up of the independently rotatable shaft.

Assuming that gasifier speed $N_1$ is 90% of design speed and assuming that the output turbine speed $N_2$ is 80% of design speed, initially the operational amplifier 70 will be maintained in the low output state to produce clutch pressure profiles as at curve 155 in FIG. 3. As the output turbine speed approaches that of the gasifier speed this low voltage output state will be maintained by the detector circuit 48 even though synchronous speed is approached.

Figure 4:
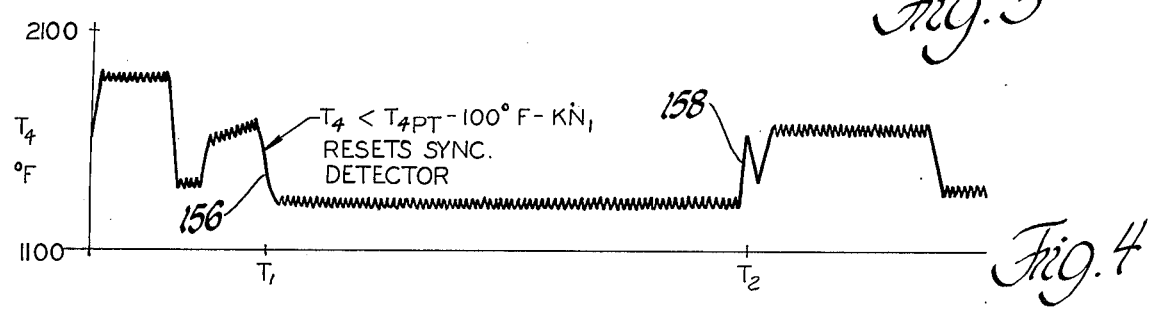
FIG. 4 is a chart of turbine inlet temperature produced upon synchronous speed operation of the independently rotatable turbines of the turbine engine in FIG. 1.

One characteristic of the illustrated gas turbine engine 10 is that it experiences an abrupt fall in turbine inlet temperature when the $N_1$ speed is equal to the $N_2$ speed. This is shown in the chart of FIG. 4 at control point 156 thereon. When this occurs, the temperature detector 50 will produce a voltage at the potential point 136 which when compared to the control voltage of the non-inverting input of the operational amplifier 140 will produce a low voltage state at potential point 148 to cause the input terminals of the operational amplifier 70 to be reset to $N_2$ signal = $N_1$ signal − 3 percent (design speed), in other words the operational amplifier 70 is reset to an under-synchronous input state even though $N_1 = N_2$. This will maintain the output voltage of the operational amplifier 70 at a low state until clutch pressure is dumped as explained in the following sequence.

As soon as the input turbine temperature rises as shown at point 158 in FIG. 4, temperature signal generator 50 and comparator 56 will be conditioned to increase the potential at control point 148 to a high state potential. With line 90 in the low state and transistor 96 in the non-conducting state the high signal at 148 is allowed to pass through series resistor 150 to line 99 to condition the clutch control switch 54 to produce a quick dump of the control valve in hydraulic circuit 102 thereby to prevent load increases on the output shaft 14 from overtemperaturing the gasifier section at a time of deceleration of the gasifier turbine thereby avoiding conditions of compressor surge. Clutch dump is shown in FIG. 3. Detector 48 resumes the over-synchronous function as $N_2$ decreases to a point less than $N_1 - 3$ percent and the transistor quick dump inhibit switch 52 is reverted to a conduction state.

The embodiments of the invention in which an exclusive property or privilege is claimed are defined as follows:

1. In a gas turbine power plant having a gas generator including a compressor, combustion apparatus, a compressor drive turbine and a power turbine coupled to the gas generator and torque transmitting means including a selectively energized clutch for coupling the compressor drive turbine and power turbine to regulate the amount of power transfer therebetween and wherein the combustion apparatus temperature is characterized by falling abruptly when the power turbine and compressor drive turbine are operated at synchronous speed the improvement comprising: means for unloading said clutch to prevent power transfer from the power turbine to the compressor drive turbine capable of producing compressor surge, means for generating first and second signals corresponding to power turbine speed and compressor drive turbine speed, respectively, oversynchronous speed detector means for comparing said first and second signals including means to produce a first predetermined output signal, quick dump inhibit means having an input responsive to said first predetermined output signal and an output signal for controlling said selectively energized clutch, said quick dump inhibit means being responsive to said first predetermined output signal to prevent quick unloading of said clutch, said oversynchronous speed detector means including means conditionable to produce an oversynchronous speed trip signal when the power turbine speed exceeds that of said compressor turbine speed, means for sensing and producing an engine temperature signal, means for producing a temperature schedule signal and a signal in response to the derivative of compressor drive turbine speed, signal generating means operative in response to said temperature signals and the signal of the derivative of the speed of said compressor drive turbine at the abrupt change in engine temperature produced upon the power turbine speed becoming synchronous with the compressor turbine speed to produce a temperature drop output signal in response to synchronous speed operation of the compressor turbine and the power turbine, comparator means responsive to the temperature drop output signal to condition said oversynchronous speed detector means to maintain said first predetermined output signal as the speed of said compressor drive turbine approaches and becomes synchronous with the speed of said power turbine, said signal generator means and comparator means being responsive to an increase in engine temperature subsequent to the abrupt temperature fall at synchronous speed operation of the power turbine and compressor drive turbine to condition said oversynchronous speed detector means to produce an oversynchronous speed trip signal for conditioning said quick dump inhibit means to produce a quick dump of said clutch thereby to prevent load transfer from said power turbine to the compressor drive turbine.

2. In a gas turbine power plant having a gas generator including a compressor, combustion apparatus, a compressor drive turbine and a power turbine coupled to the gas generator and torque transmitting means including a selectively energized clutch for coupling the compressor drive turbine and power turbine to regulate the amount of power transfer therebetween and wherein the combustion apparatus temperature is characterized by falling abruptly when the power turbine and compressor drive turbine are operated at synchronous speed the improvement comprising means for unloading said clutch including selectively energized switch means to prevent power transfer from the power turbine to the compressor drive turbine capable of producing compressor surge, means for generating first and second signals corresponding to power turbine speed $N_2$ and compressor drive turbine speed N1, oversynchronous speed detector means including an operational amplifier for comparing said first and second signals and input means preset to $N_2 \geq N_1 + 3\%$ (design speed of $N_1$) to produce a high state output signal, quick dump inhibit means having an input responsive to said high state output signal and an on-off output signal for controlling said selectively energized switch means of said clutch, said quick dump inhibit means being responsive to said high state output signal to an on state to prevent quick unloading of said clutch, means for sensing and producing an engine temperature signal, means for producing a temperature schedule signal and a signal in response to the derivative of compressor drive turbine speed, signal generator means operative in response to said temperature signals and the signal of the derivative of the speed of said compressor drive turbine at the abrupt change in engine temperature produce upon the load turbine speed becoming synchronous with the compressor turbine speed to produce a temperature drop output signal in response to synchronous speed operation of the compressor turbine and the power turbine, comparator means responsive to the temperature drop output signal to condition said over-synchronous speed detector means to reset the input means of said operational amplifier to maintain the low state output signal while the $N_2$ signal approaches and becomes synchronous with the $N_1$ signal, said signal generator means and comparator means being responsive to an increase in engine temperature subsequent to the abrupt temperature fall at synchronous speed operation of the power turbine and compressor drive turbine to condition said over-synchronous speed detector means input means to produce an oversynchronous speed trip input signal from said operational amplifier for conditioning said quick dump inhibit means to produce a quick dump of said clutch thereby to prevent load transfer from said power turbine to the compressor drive turbine.

3. A synchronous speed control circuit for use in a gas turbine power plant having a gas generator including a compressor, combustion apparatus, a compressor drive turbine and a power turbine coupled to the gas generator and torque transmitting means including a selectively energized clutch for coupling the compressor drive turbine and power turbine to regulate the amount of power transfer therebetween and wherein the combustion apparatus temperature is characterized by falling abruptly when the power turbine and compressor drive turbine are operated at synchronous speed comprising, means for unloading the clutch including to prevent power transfer from the load turbine to the compressor drive turbine capable of producing compressor surge, oversynchronous speed detector mean including first and second input voltages and an operational amplifier, for comparing said first and second inputs, said operational amplifier having inverting and non-inverting inputs, an output circuit and an impedance connected from the output circuit to the non-inverting input for producing a low voltage and high voltage output signal, quick dump inhibit means responsive to said output signals for controlling said selectively energized clutch, said quick dump inhibit means being responsive to said low voltage signal to prevent quick unloading of said clutch and operative in response to the high voltage signal to dump the clutch, means for sensing and producing an engine temperature signal, means for producing a temperature schedule signal and a signal in response to the derivative of compressor drive turbine speed, signal generator means operative in response to said temperature signals and the derivative of the speed of said compressor drive turbine at the abrupt change in engine temperature produced upon the load turbine speed becoming synchronous with the compressor turbine speed to produce a temperature drop output signal in response to synchronous speed operation of the compressor turbine and the power turbine, comparator means including a resistor and diode connected to the non-inverting terminal of said amplifier and means responsive to ther temperature drop output signal to cause current flow through said resistor and diode to reset the non-inverting input of said operational amplifier to alternate the effect of said impedance to produce the low voltage output signal from said amplifier as one of said inputs exceeds the other of the inputs in voltage, said signal generator means and comparator means being responsive to an increase in engine temperature subsequent to the abrupt temperature fall at synchronous speed operation of the load turbine and compressor drive turbine to render said resistor and diode non-conductive to allow the oversynchronous detector to revert to the normal state to produce the low voltage output signal for conditioning said quick dump inhibit means to produce a quick dump of said clutch thereby to prevent load transfer from said power turbine to the compressor drive turbine.

* * * * *